United States Patent
Yoon et al.

(10) Patent No.: US 8,822,006 B2
(45) Date of Patent: Sep. 2, 2014

(54) CORE OF VACUUM INSULATION MEMBER AND VACUUM INSULATION MEMBER USING THE SAME

(75) Inventors: Ilseob Yoon, Changwon-si (KR); Dongju Jung, Changwon-si (KR); Minkyu Hwang, Changwon-si (KR); Jinwoo Shim, Changwon-si (KR); Kyungdo Kim, Changwon-si (KR); Youngbae Kim, Changwon-si (KR)

(73) Assignee: LG Electronics Inc., Seoul (KR)

( * ) Notice: Subject to any disclaimer, the term of this patent is extended or adjusted under 35 U.S.C. 154(b) by 202 days.

(21) Appl. No.: 13/387,441

(22) PCT Filed: Aug. 6, 2010

(86) PCT No.: PCT/KR2010/005173
§ 371 (c)(1),
(2), (4) Date: Jan. 27, 2012

(87) PCT Pub. No.: WO2011/016693
PCT Pub. Date: Feb. 10, 2011

(65) Prior Publication Data
US 2012/0128920 A1    May 24, 2012

(30) Foreign Application Priority Data

Aug. 7, 2009 (KR) .................. 10-2009-0072996

(51) Int. Cl.
*E04B 1/80* (2006.01)
*F16L 59/065* (2006.01)
*F16L 59/07* (2006.01)

(52) U.S. Cl.
CPC ........... *F16L 59/065* (2013.01); *F25D 2201/14* (2013.01); *F16L 59/07* (2013.01)
USPC ............................................................. 428/69

(58) Field of Classification Search
CPC ............................... E04B 1/803; F16L 59/065
USPC ........................................................ 428/69, 76
See application file for complete search history.

(56) References Cited

U.S. PATENT DOCUMENTS

2010/0252698 A1* 10/2010 Dye et al. ................... 248/177.1

FOREIGN PATENT DOCUMENTS

| | | |
|---|---|---|
| JP | 61-40594 U | 3/1986 |
| JP | 06-306969 A | 1/1994 |
| JP | 2002-017088 A | 3/2002 |
| JP | 2003-042388 A | 2/2003 |
| KR | 20-1982-0000087 Y1 | 2/1982 |
| KR | 10-2007-0100384 A | 10/2007 |

OTHER PUBLICATIONS

International Search Report and Written Opinion dated May 2, 2011 issued in Application No. PCT/KR2010/005173.

* cited by examiner

*Primary Examiner* — Alexander Thomas
(74) *Attorney, Agent, or Firm* — Ked & Associates, LLP

(57) ABSTRACT

A core of a vacuum insulation member and a vacuum insulation member using the same are disclosed. The core of a vacuum insulation member includes: a plurality of plates which are spaced apart from each other; and a support member supporting the plurality of plates between the plates.

9 Claims, 3 Drawing Sheets

Fig. 11
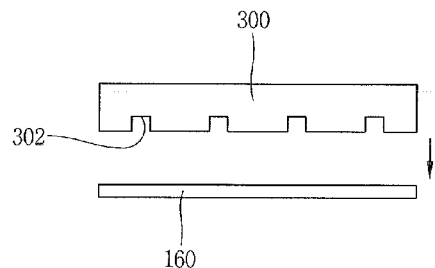
[Fig. 12
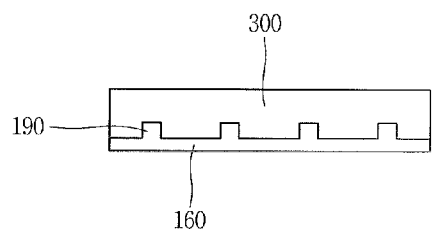
Fig. 13
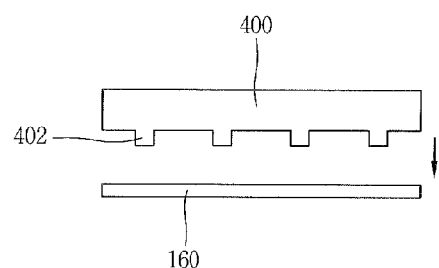
Fig. 14
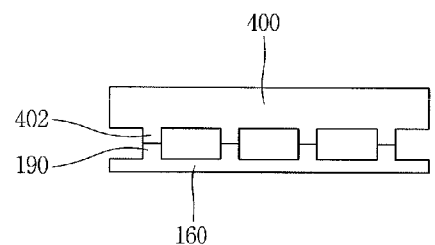

CORE OF VACUUM INSULATION MEMBER AND VACUUM INSULATION MEMBER USING THE SAME

TECHNICAL FIELD

The present invention relates to a core of a vacuum insulation member and a vacuum insulation member using the same, and more particularly, to a vacuum insulation member embedded in a wall body of a refrigerator to increase an insulation performance, and a core included in the vacuum insulation member.

BACKGROUND ART

In general, a vacuum insulation member is a sort of insulator decompresses an internal space into a vacuum state to thus use the characteristics of low thermal conductivity of vacuum. The vacuum insulation member may be implemented in the form of a panel having a certain thickness.

The vacuum insulation panel may be configured to include an envelope forming a certain space therein and a core accommodated at an inner side of the envelope and supporting such that the envelope to maintain the certain space. In addition, a getter for absorbing an internal gas of the envelope may be provided at the inner side of the envelope.

The envelope (e.g., a film), serving to maintain an internal vacuum degree of the vacuum insulation member at a certain level, is formed of a film formed by laminating multi-layered polymers and aluminum, or the like, and the core is formed by curing glass fiber by using a binder or the like or forming it in the form of a board. The getter is a sort of aspirator or an absorbent for absorbing gas and/or moisture which is present at the inner side of the envelope or newly introduced.

In general, the vacuum insulation member using glass fiber has the coefficient of thermal conductivity of about 0.0035 W/m·K, and recently, a vacuum insulation member has been developed by modifying the material and structure to have the coefficient of thermal conductivity of about 0.002 W/m·K to thereby obtain a maximum insulation performance.

As the performance of the vacuum insulation member is improved, the vacuum insulation member can become thinner, so when such a vacuum insulation terminal is employed for a refrigerator or the like, a larger internal volume can be advantageously obtained for the same outer appearance. Thus, a vacuum insulation member having better insulation performance is required, but the insulation characteristics of the related art vacuum insulation member using glass fiber have a limitation.

DISCLOSURE OF INVENTION

Technical Problem

An aspect of the present invention provides a core, which can replace a core using glass fiber, for a vacuum insulation member having better insulation performance.

Another aspect of the present invention provides a vacuum insulation member having a superior insulation performance to the related art vacuum insulation member using glass fiber.

Solution to Problem

According to an aspect of the present invention, there is provided a core of a vacuum insulation member, including: a plurality of plates which are spaced apart from each other; and a support member supporting the plurality of plates between the plates.

In the aspect of the present invention, as the core of a vacuum insulation member, a core including the plates in contact with an envelope to thus support an inner surface of envelope and the support member maintaining a space between the plates may be used, rather than being formed by compressing the related art glass fiber. Besides, the support member serves to limit heat transmission generated in a thickness direction of the core. Namely, when the core has the shape of a solid rectangular box, the entire internal surfaces are a heat transmission path, but in an exemplary embodiment of the present invention, only the support member serves as a heat transmission path, so the area for heat transmission can be reduced.

In this case, because the space between the plates is maintained in a vacuum state, atmospheric pressure is applied to the plates when used in a vacuum insulation member. Thus, in order to uniformly support the plates, a plurality of posts may be evenly distributed across the entire plates. Here, the plates or the support member may be made of a material having a high strength and a low coefficient of thermal conductivity. For example, the plates or the support member may be made of a synthetic resin.

Here, the support member may include a plurality of posts extending between a pair of plates. Both end portions of each of the posts may be in contact with a facing plate to support the plate. The posts may be integrally formed with the plates. Each of the posts may have a circular or polygonal section.

Here, a junction plate extending to be parallel to the plate may be formed on at least one of the both end portions of each of the posts. In order to lower the coefficient of thermal conductivity, the sectional area of each of the posts should be reduced, but if the sectional area is too small, the stress concentrated to the plates increases to potentially damage the plates. Thus, in order to reduce the stress concentration, the junction plate may be used.

When the junction plates are formed at both end portions of each of the posts, the posts may have a channel-like shape when viewed from the side.

The posts positioned at both sides of the plates may not overlap with each other in a thicknesswise direction of the plates. This aims at lengthening the heat transmission path to lower the coefficient of thermal conductivity. If the posts positioned at upper and lower surfaces of the plates are aligned in a row, heat would directly traverse the core along the posts. However, when the posts are positioned at the upper and lower surfaces of the plate such that they do not overlap, namely, when they are positioned to go crisscross, heat being transferred through the posts is transmitted to a degree along the plates and then transferred to the posts, lengthening the heat transmission path as much.

Besides, the posts positioned at both sides of the plates may overlap only partially in the thicknesswise direction of the plates.

Meanwhile, a plurality of through portions may be formed on at least one of the plates. The through portions serve to reduce the area of the plates to thus reduce the path along which heat is transmitted. Here, the through portion may be formed on the other remaining plates than the uppermost and lowermost plates.

The through portions may have a rectangular shape, and accordingly, the plates may have a lattice form. In this case, the posts may be positioned at each crossing of the lattice form.

According to another aspect of the present invention, there is provided a core of a vacuum insulation member, including: first and second plates having a plate form; one or a plurality of intermediate plates disposed between the first and second plates; and posts disposed between the plates to support the plates.

Here, a plurality of through holes may be formed on the intermediate plates, and the through portions may have a rectangular shape. Also, the intermediate plates may have a lattice form.

A portion of the lattice may have a cutaway portion, here, by having the cutaway potion, the respective sides of the lattice are disconnected, rather than being connected, whereby a path for transmitting heat may be interrupted or lengthened.

The cutaway portion may be positioned at an end portion of each of the post. In this case, because a junction area with the posts is reduced by the area of the cutaway portion, the heat transmission area can be reduced as much.

Each of the posts may be disposed at each crossing of the lattice form.

The posts positioned at both sides of the plates may not overlap in a thicknesswise direction of the plates.

According to another aspect of the present invention, there is provided a vacuum insulation member including: an envelope; a core encapsulated by the envelope; and a getter positioned at the core, and in this case, the core is one of the foregoing cores.

Advantageous Effects of Invention

According to exemplary embodiments of the present invention, the vacuum space formed between the plates can improve the insulation performance, and also, because the heat transmission path is minimized while stably maintaining the structure of the core by means of the support member, excellent insulation performance, compared with that of the related art, can be provided.

The foregoing and other objects, features, aspects and advantages of the present invention will become more apparent from the following detailed description of the present invention when taken in conjunction with the accompanying drawings.

BRIEF DESCRIPTION OF DRAWINGS

FIGS. 11 and 12 illustrate a process of fabricating the core illustrated in FIG. 3; and FIGS. 13 and 14 illustrate another process of fabricating the core illustrated in FIG. 3.

BEST MODE FOR CARRYING OUT THE INVENTION

Exemplary embodiments of the present invention will now be described in detail with reference to the accompanying drawings.

Figure 1:
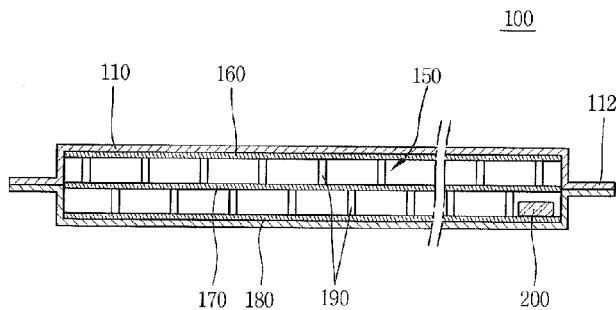
FIG. 1 is a sectional view showing an example of a vacuum insulation member having a core according to an exemplary embodiment of the present invention.
Figure 2:
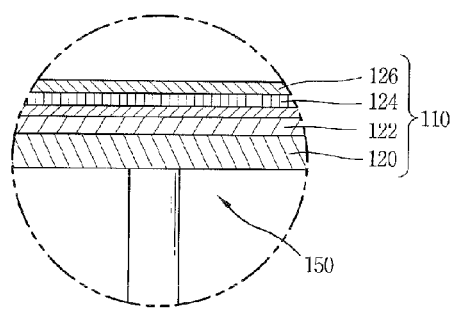
FIG. 2 is an enlarged sectional view showing a portion of the embodiment illustrated In FIG. 1.

FIG. 1 is sectional view showing an example of a vacuum insulation member having a core according to an exemplary embodiment of the present invention, and FIG. 2 is an enlarged sectional view showing a portion of the embodiment illustrated In FIG. 1.

As shown in FIGS. 1 and 2, a vacuum insulation member 100 may be configured to include an envelope 110 having gas barrier characteristics and forming a certain decompressed space therein, a core 150 disposed at an inner side of the envelope and supporting the envelope; and a getter 200 provided at the inner side of the envelope. Here, the decompressed space may be a space in which internal pressure is decompressed to be lower than atmospheric pressure.

The envelope 110 is formed not to allow air to be introduced therein or has gas barrier characteristics in order to form the decompressed space therewithin. In addition, a junction part 112 may be formed at one side of the envelope after the core 150 is accommodated. Namely, the envelope is provided in the form that one side thereof is open during a fabrication process, and a completed core is pushed in through the open side, which is then encapsulated to hermetically seal the open side. The hermetically sealed side corresponds to the junction part 112.

The envelope includes a plurality laminated film layers. FIG. 2 shows such film layers. The lowermost layer that contacts to the core of the plurality of film layers is formed as a heat blocking layer 120, on which an aluminum foil 122, a protection layer 124, and an aluminum foil film 126 are sequentially laminated.

The getter 200 for absorbing a gas remaining at the inner side of the envelope or a gas introduced from the exterior to the interior of the envelope. In general, getters having various components are used to absorb various types of gas such as an infiltration gas infiltrating from the exterior or a leakage gas generated from the internal core or the like, but in the present exemplary embodiment, there is no gas leaked from the core or a very little amount of gas is leaked, so moisture is a critical factor affecting the insulation performance. Thus, it would be sufficient for the getter 200 to include CaO or zeolite such that mainly moisture can be absorbed. Here, as illustrated, the getter 200 has the shape of a certain block or the shape of a rectangular parallelepiped, otherwise, the getter 200 may be configured to be coated on an inner surface of the envelope or on the surface of the core.

The core 150 may be made of a synthetic resin material, and thus, a preprocessing process (e.g., hot pressing, needle punching, and the like) that should be necessarily performed in case of using a glass fiber core) is not required. Also, in case of the glass fiber core, there is a problem such as degradation of a vacuum degree due to gas leaked from a binder used to allow the glass fiber core to have a certain hardness or form. However, in the present exemplary embodiment, because the core 150 is made of a synthetic resin material, such a problem as degradation of a vacuum degree due to a leaked gas or the like does not arise.

Figure 3:
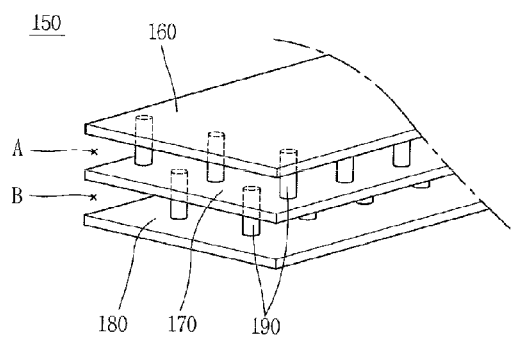
FIG. 3 is a perspective view showing a core part of the embodiments illustrated in FIG. 1.

FIG. 3 is an enlarged perspective view showing the core 150. With reference to FIG. 3, the core 150 includes a total of three plates: an upper plate 160 positioned at the uppermost part, a lower plate 180 positioned at the lowermost part, and an intermediate plate 170 positioned at the central part. The respective plates are disposed to be spaced apart from each other, and the space present between the plates acts as a vacuum space on the vacuum insulation member. The getter 200 is disposed in the space.

A plurality of posts 190 are disposed as support members between the plates 160. Each of the posts 190 has a cylindrical shape as illustrated in FIG. 3, and both end portions thereof are bonded to two facing plates. In FIG. 3, each of the posts has a diameter of about 1 mm and a height of about 3 mm.

Figure 4:
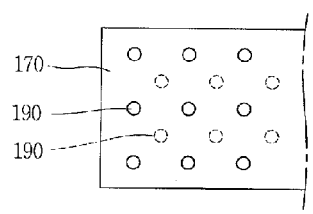
FIG. 4 is a plan view showing an intermediate plate of the core of the embodiments illustrated in FIG. 3.

In FIG. 3, the posts are disposed in an upper space (A) and a lower space (B). The posts positioned in the upper space (A) and the posts positioned in the lower space (B) are disposed in a crisscross manner. Namely, as shown in FIG. 4, the posts (indicated by a solid line in FIG. 4) positioned on the plate, e.g., the intermediate plate 170 do not overlap with the posts (indicated by a dotted line in FIG. 4) positioned under the intermediate plate 170. Accordingly, heat transmitted to the lower plate 180 is transmitted in a vertical direction along the posts 190, transmitted in a horizontal direction along the intermediate plate 170, transmitted in the vertical direction along the posts, and then transmitted to the upper plate 160.

Thus, compared to a case in which the posts positioned on the upper and lower sides are aligned in a row, a heat transmission path is lengthened to result in an increase in heat resistance.

Figure 5:
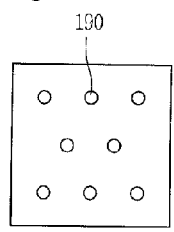
FIG. 5 is a view showing another example of the core illustrated in FIG. 3, which corresponds to FIG. 4.
Figure 6:
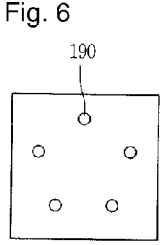
FIG. 6 is a view showing another example of the core illustrated in FIG. 3, which corresponds to FIG. 4.
Figure 7:
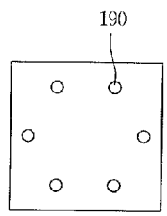
FIG. 7 is a view showing another example of the core illustrated in FIG. 3, which corresponds to FIG. 4.

Meanwhile, the posts 190 may be arranged in various other forms than the rectangular arrangement illustrated in FIG. 4. For example, as shown in FIGS. 5 to 7, the posts 190 may be arranged in a triangular form, a pentagonal form, or a hexagonal form.

Figure 8:
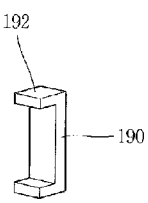
FIG. 8 is a perspective view showing a variant of a post of the core illustrated in FIG. 3.

In addition, the shape of the posts may have a polygonal section, besides the cylindrical shape as illustrated. In particular, the sectional area of each of the posts is a factor significantly affecting heat resistance of the entire core, and in this case, the smaller the sectional area of each of the posts, the better, in terms of heat resistance, but if the sectional area of each of the posts is too small, the strength of the posts would be degraded to cause buckling or concentrate stress to the plates. Thus, as shown in FIG. 8, junction plates 192 are formed to extend from the both end portions of each of the posts 190, making the posts have a channel-like shape overall. Such a shape contributes to reduce heat resistance and reduce concentration of stress to the plates.

Meanwhile, as stated above, heat is also transmitted through the plates. In particular, heat, which has passed through the posts, is transmitted along the plates, and in this case, in order to reduce heat resistance of the plates through portions may be formed on the plates.

Figure 9:
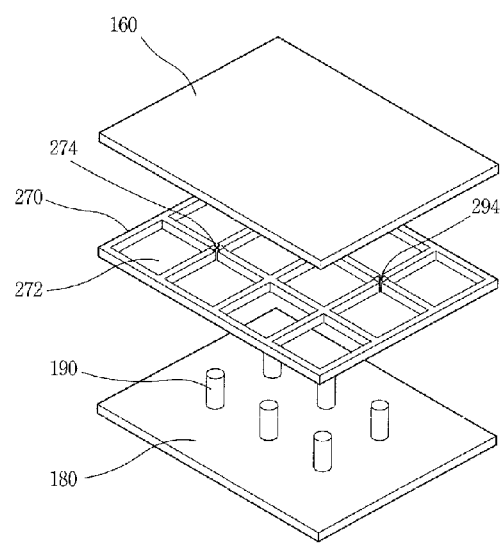
FIG. 9 is an exploded perspective view showing another example of the core illustrated in FIG. 3.

FIG. 9 illustrates a second example of the core material according to an exemplary embodiment of the present invention. In the example illustrated in FIG. 9, the upper plate 160, the lower plate 180, and the posts 190 are the same as those illustrated in FIG. 3, so a repeated description will be omitted. With reference to FIG. 9, an intermediate plate 270 includes a plurality of through portions 272 in a rectangular shape. Thus, due to the presence of the through portions 272, the intermediate plate 270 has a lattice form and the posts 190 are bonded to the vertexes of each lattice.

Figure 10:
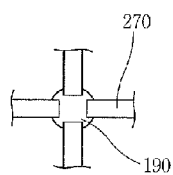
FIG. 10 is a plan view showing a portion of an intermediate plate of the core illustrated in FIG. 3.

Owing to the through portions, the sectional area of the path along which transmitted heat is transmitted along the plates can be reduced to result in an increase in heat resistance. In addition, as shown in FIG. 9, a cutaway portion 274 is formed at a certain vertex. Accordingly, the respective sides constituting the lattice are disconnected, rather than being continued, which serves to block the heat transmission path. Here, as shown in FIG. 10, a cutaway width of the cutaway portion 274 is smaller than the diameter of each of the posts, so each end portion of the cutaway portion 274 is placed on each of the posts so as to be bonded.

Meanwhile, the through portions are not formed on the upper plate and the lower plate. The reason is because the upper plate and the lower plate serve to support a rear surface of the envelope of the vacuum insulation member. If the through portions are formed on the upper plate and the lower plate, the surface of the envelope would be uneven or bumpy and the portions of the envelope corresponding to the through portions could not be supported, causing damage to the envelope.

Meanwhile, the posts and the plates may be integrally formed. In order to mold the posts and plates, a general injection molding method may be used, and besides, various other methods may be also used.

FIG. 11 schematically illustrates a method for molding the posts and plates. After the plate 160 is prepared, a molding frame 300 is pressure-welded to the surface of the plate 160. The surface of the molding frame 300 includes recesses 302 having the same dimension as that of each of the posts 190. When the molding frame 300 in a heated state is pressure-welded to the plate 160, a portion of the molten surface of the plate 160 is introduced into the interior of the recesses 302. In this state, the molding frame 300 is separated to obtain the post-formed plate. After a plurality of plates are formed, they may be sequentially laminated to obtain the core as described above.

In a different method, as shown in FIG. 13, a molding frame 400 having projections 402 are brought into contact with the surface of the plate 160 to obtain a post-formed plate. Namely, the heated molding frame 400 is brought into contact with the surface of the plate 160 and then gradually lifted. Then, the surface of the molten plate is protruded upward along the projections 402. Thereafter, the molding frame 400 may be separated and end portions of the protruded surface may be cut to obtain the post-formed plate.

As the present invention may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

The invention claimed is:

1. A core of a vacuum insulation member, the core comprising:
a plurality of plates which are spaced apart from each other; and a support member supporting the plurality of plates between the plates,
wherein the support member comprises a plurality of posts extending between a pair of the plates,
wherein a plurality of through portions are formed on at least one of the plates,
wherein the plates including the through portions have a lattice form,
wherein a portion of the lattice has a cutaway portion
wherein the cutaway portion is positioned at an end portion of each post, and wherein the posts positioned at either side of the plates do not overlap with each other in a thicknesswise direction of the plates.

2. The core of claim 1, wherein the posts have a circular or polygonal section.

3. The core of claim 2, wherein a junction plate extending to be parallel to the plurality of plates is formed on at least one of the end portions of each post.

4. The core of claim 3, wherein each post has a channel-like shape when viewed from a side.

5. The core of claim 1, wherein the plurality of plates comprises uppermost and lowermost plates, and the through portions are formed on plates other than the uppermost and the lowermost plates.

6. The core of claim 1, wherein the posts are positioned at each crossing of the lattice form.

7. A vacuum insulation member comprising: an envelope; a core encapsulated by the envelope; and a getter positioned at the core, wherein the core is one of the cores described in claim 1.

8. A core of a vacuum insulation member, the core comprising: first and second plates having a plate form; one or a plurality of intermediate plates disposed between the first and second plates; and posts disposed between the plates to support the plates, wherein a plurality of through holes are formed on the intermediate plates, wherein the intermediate plates have a lattice form, wherein a portion of the lattice has a cutaway portion, wherein the cutaway portion is positioned at an end portion of each of the post, and wherein the posts positioned at either side of the plates do not overlap in a thicknesswise direction of the plates.

9. The core of claim 8, wherein each of the posts is disposed at each crossing of the lattice form.

* * * * *